United States Patent
Smith

(10) Patent No.: US 6,676,358 B2
(45) Date of Patent: Jan. 13, 2004

(54) COMPACT FOLDING AIRCRAFT PASSENGER RAMP

(76) Inventor: Dave W. Smith, 238 Scarboro Avenue S.W., Calgary, Alberta (CA), T3C 2H3

( * ) Notice: Subject to any disclaimer, the term of this patent is extended or adjusted under 35 U.S.C. 154(b) by 172 days.

(21) Appl. No.: 10/073,282

(22) Filed: Feb. 13, 2002

(65) Prior Publication Data

US 2003/0077155 A1 Apr. 24, 2003

Related U.S. Application Data

(60) Provisional application No. 60/330,126, filed on Oct. 19, 2001.

(51) Int. Cl.$^7$ .............................. B60P 1/00; B64F 1/315; B66F 3/24; E01D 1/00; E01D 19/04
(52) U.S. Cl. .................... 414/340; 414/537; 14/69.5; 14/71.3; 182/115; 244/137.2
(58) Field of Search ................................. 414/340, 345, 414/346, 537; 14/69.5, 71.3, 71.5, 71.7; 296/61, 137.1, 137.2, 118.5; 244/137.1, 137.2, 118.5; 182/115, 116, 117, 123, 127, 129, 152, 141

(56) References Cited

U.S. PATENT DOCUMENTS

| | | | | |
|---|---|---|---|---|
| 3,263,253 A | * | 8/1966 | Wollard et al. | 14/71.5 |
| 3,404,417 A | * | 10/1968 | Wollard et al. | 14/71.5 |
| 3,412,412 A | * | 11/1968 | Kjerulf et al. | 14/71.5 |
| 3,462,784 A | * | 8/1969 | Seipos | 14/71.5 |
| 3,538,529 A | * | 11/1970 | Breier | 14/71.5 |
| 3,808,626 A | * | 5/1974 | Magill | 14/71.5 |
| 3,910,264 A | * | 10/1975 | Mahieu | 182/115 |
| 5,154,569 A | * | 10/1992 | Eryou et al. | 244/137.2 |
| 6,109,854 A | * | 8/2000 | Thompson et al. | 14/69.5 |
| 6,330,726 B1 | * | 12/2001 | Hone et al. | 14/71.3 |
| 6,390,757 B2 | * | 5/2002 | Ganiere | 414/391 |
| 6,496,996 B1 | * | 12/2002 | Worpenberg et al. | 14/71.5 |

* cited by examiner

Primary Examiner—Eileen D. Lillis
Assistant Examiner—Paul T. Chin
(74) Attorney, Agent, or Firm—Sean W. Goodwin

(57) ABSTRACT

A mobile passenger ramp for loading and unloading aircraft, the ramp comprising having upper and lower frame sections connected pivotally so that the ramp can be folded for storage or movement about the tarmac and unfolded at an obtuse angle to form a wide "footprint" to provide wind or jet blast stability. An arcuate surface bridges between the ramps of the two frames when unfolded. The compact ramp remains safely clear of a "No-Go" zone while still being sufficiently long to minimize the slope of the ramp for improved ease of use by passengers, either ambulatory or in wheelchairs. A steerable wheel at one end of the ramp enables rotation of one frame about the pivoting connection for folding and unfolding the frames. Fixed wheels on the upper frame and a castored wheel positioned near the pivot point on the lower frame provide stability and easy maneuverability of the folded ramp.

22 Claims, 8 Drawing Sheets

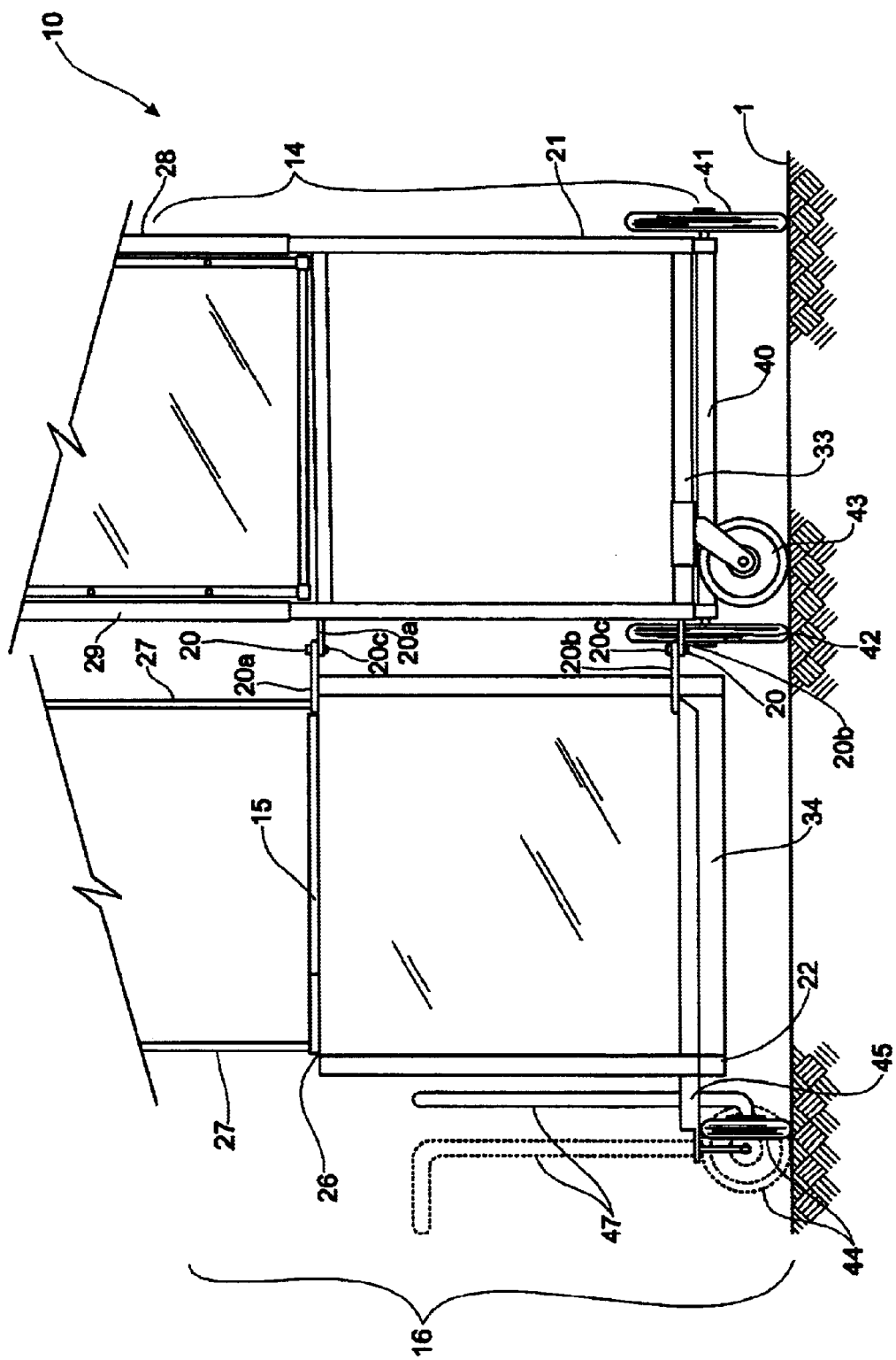

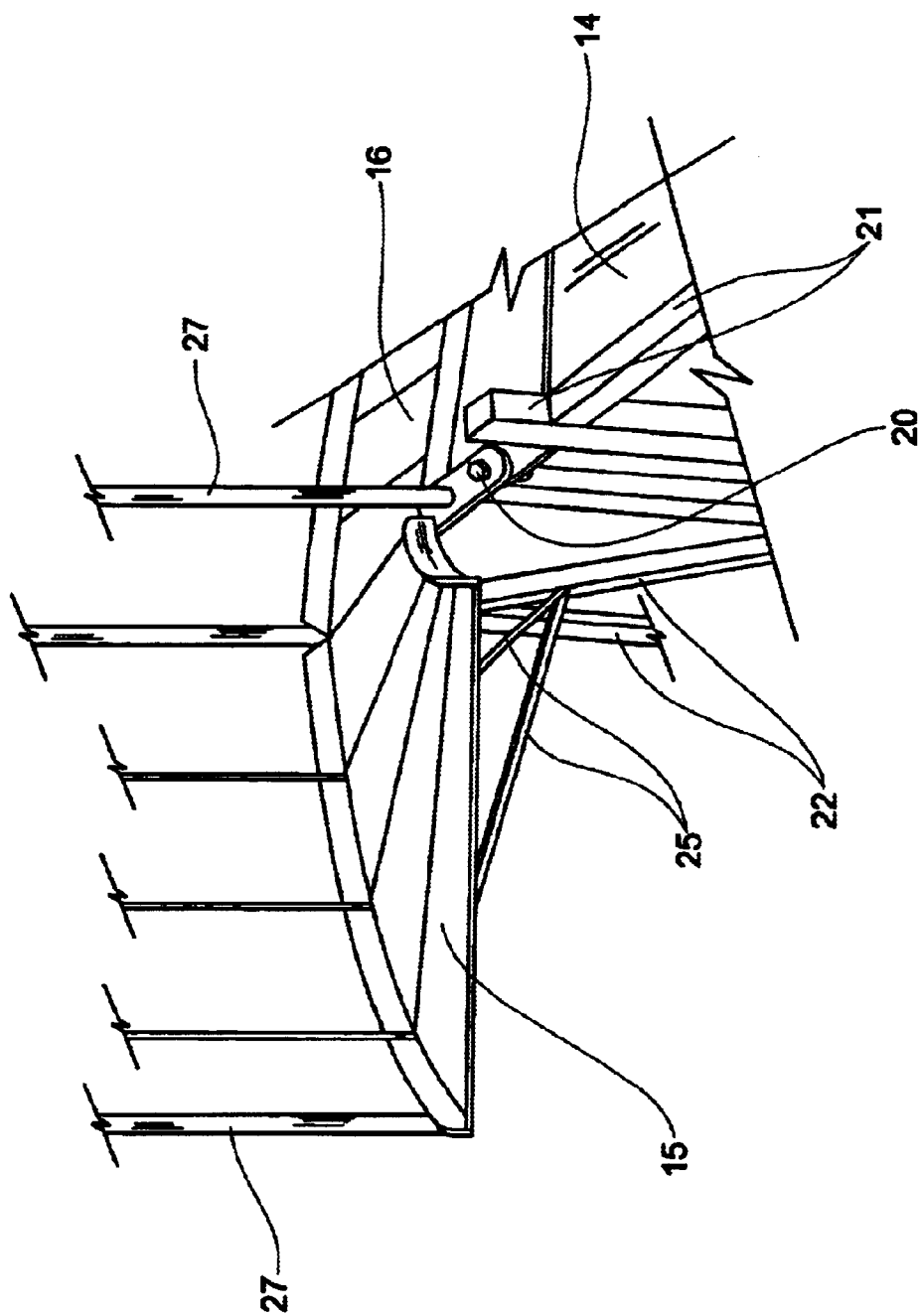

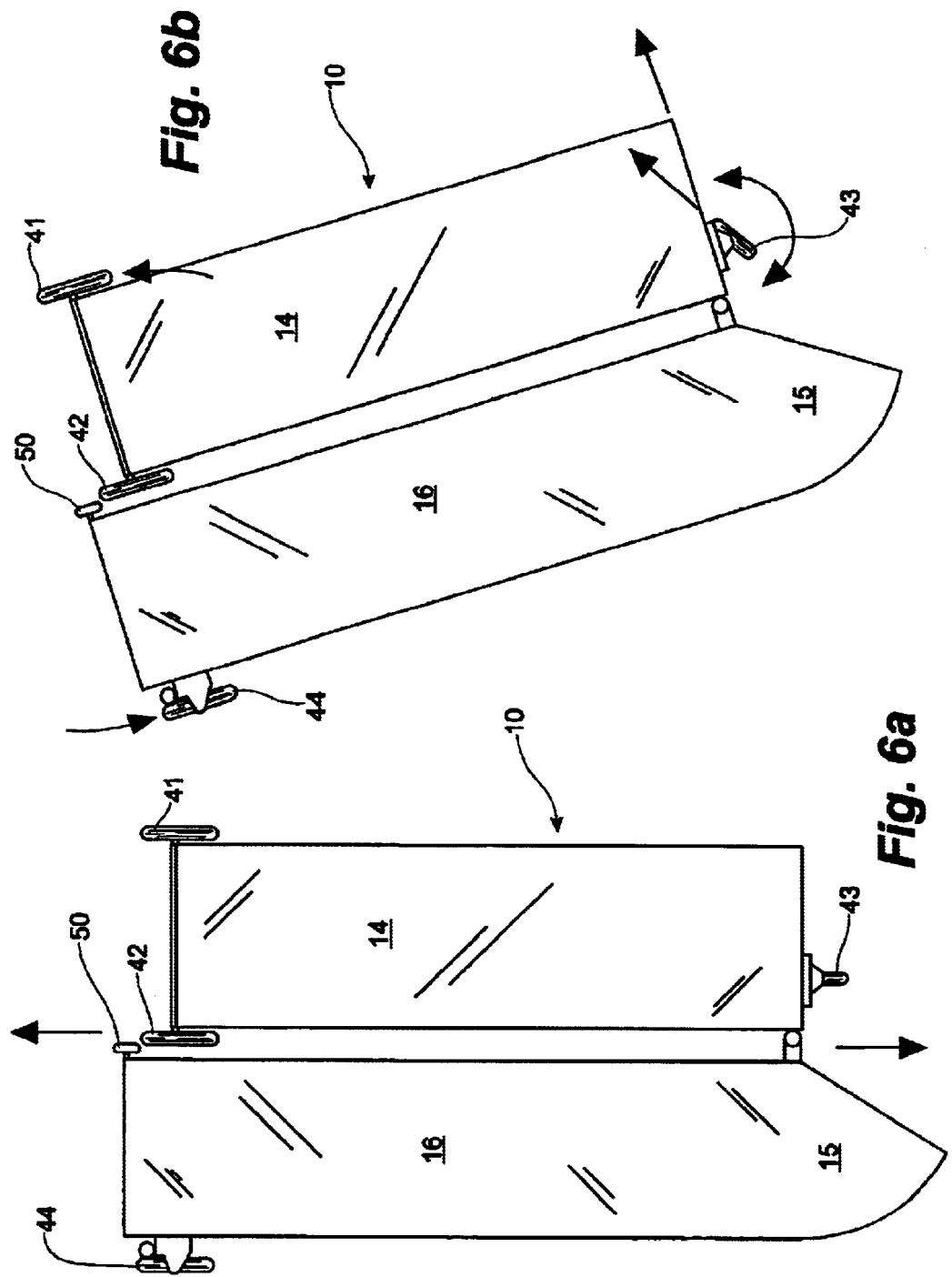

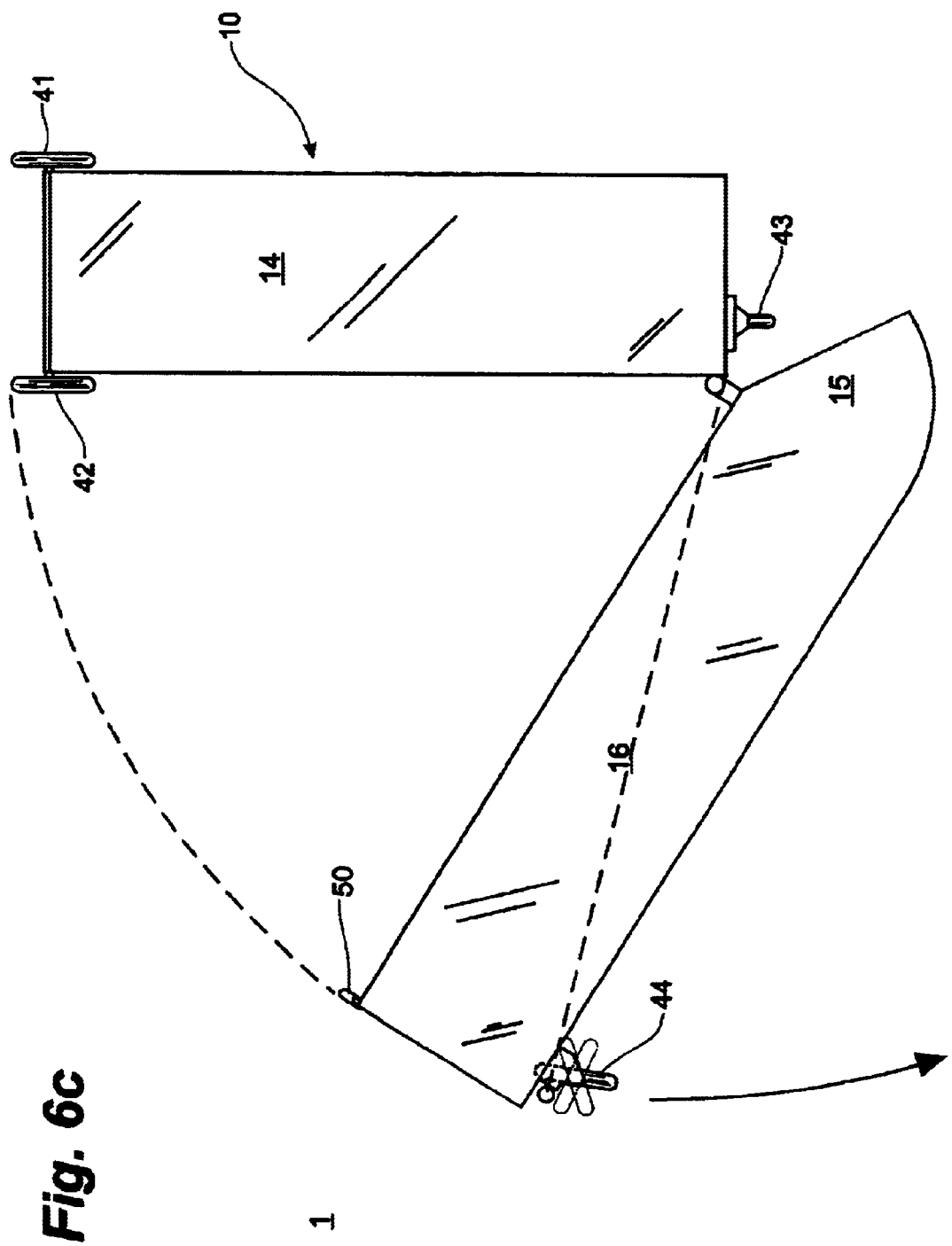

COMPACT FOLDING AIRCRAFT PASSENGER RAMP

CROSS REFERENCE TO RELATED APPLICATION

This application is a regular application of US provisional application Serial No. 60/330,126, filed Oct. 19, 2001, the entirety of which is incorporated herein by reference.

FIELD OF THE INVENTION

The present invention relates to ramps for loading and unloading passengers or cargo between different elevations such as to an aircraft. More particularly, the invention is related to ramps, which can be used for passengers seated in wheelchairs as well as for other passengers.

BACKGROUND OF THE INVENTION

It is well known to use wheeled staircases to load and unload passengers directly from an aircraft to the tarmac. This is particularly the case for smaller aircraft that are not compatible with existing boarding bridges or in airports where boarding bridges are not readily available due to high traffic or economics. For the ease of transport of passengers who are disabled, a ramp can be used in place of a staircase.

For all passengers embarking and disembarking an aircraft, it is critical that the lower end of the ramp does not extend beyond the wing tip of the plane and into the area known in the industry as the "No Go" zone. The "No Go" zone is so termed because encroachment of the ramp and passengers would generate a risk to themselves and to other equipment or staff.

One particular problem associated with the use of a ramp is related to the slope of the ramp and its length. The slope should be low enough to be easily traversed by foot passengers and those in wheelchairs, but the length must be such that it must not extend beyond the perimeters of a safe zone in order to achieve it.

Prior art wheeled staircases are not readily adaptable to ramps as the angle from aircraft departure door to tarmac is generally too steep. Further, merely extending the straight length of the ramp to reduce the angle does not provide a safe option as the ramp then extends beyond the safe zone. An increase in the length of a wheeled ramp also acts to decrease its maneuverability and increases its vulnerability to wind, which may result in overturning. Increasing the weight of the ramp to overcome the wind further impairs the structure's maneuverability. Typically, wheeled units of this type have simple castors or wheels that are not easily steered, especially when attached to heavy, cumbersome apparatus.

Clearly there is a need for a passenger ramp that is maneuverable, wind-stable, easily adjusted in height, that also provides an acceptable slope and has a compact footprint so that it does not project into the "No Go" zone when in use.

SUMMARY OF THE INVENTION

A mobile ramp is provided which allows for the safe loading and unloading of passengers and cargo between areas of differing elevations and where stability and a compact footprint are desired. This ramp is particularly well suited to provide passenger access to and from aircraft of varying boarding heights.

The ramp is non-linear, having at least two support frames which are pivotally connected. An arcuate planar connector acts to bridge between the ramps surface of each of the two frames while positioning them at an angle relative to one another when pivoted to an unfolded position. The compact footprint of the angled ramp is such that passengers boarding and deplaning do not enter into traffic areas of the tarmac that are unsafe, such as the "No-Go" zone beyond the wing tip. Further, because of the angled orientation of the two frames, the unfolded ramp can be lengthened to maintain a low slope or gentle incline, accommodating passengers in wheelchairs, without over extending into the unsafe or "No-Go" zone.

Advantageously, for transport and storage, the ramp can be folded about the pivoting connection until the first and second frames are essentially parallel, forming a more manageable unitary structure for movement about the tarmac and for alignment with an airplane passenger door. Wheels are provided at first and second ends of the first frame to permit the unit to be moved manually. A pivoting wheel is attached to a second end of the first frame adjacent the pivot to support the connected ends of the structure when folded and to provide greater maneuverability. A steerable pivoting wheel, much like an outrigger, is attached to the second frame to permit rotation of the second frame relative to the first frame between the folded and the unfolded position.

Accordingly, in a broad aspect of the invention, a mobile ramp for loading and unloading passengers from an aircraft comprises: two frames, pivotally connected for forming a contiguous ramp, a first frame having a surface forming a ramp, two wheels at an open end and a pivoting wheel at a connected end; at least a second frame having a surface forming a ramp, an open end and a connected end which is pivotally connected to the first frame's connected end, the first and second frames being rotatable laterally about their connected ends between a folded position substantially parallel to one other and an unfolded position at an angle to one other; a bridge for extending between the connected ends of the first and second frames when in the unfolded position so that the ramps of the first and second frames become substantially contiguous at an angle to each other so that a passenger can traverse between the first and second frames respective open ends; and a pivoting wheel for supporting the second frame's open end during rotation between the folded and unfolded positions.

In a preferred embodiment, the first frame is an upper frame and the second frame is a lower frame. Further, the elevation of the first frame's open end is adjustable to permit vertical alignment of the mobile ramp such as with passenger doors of airplanes of varying heights.

Further, the pivoting wheel attached to the second lower frame's open end steerable, preferably by a handle, which permits and the second lower frame between the folded and unfolded positions. More preferably the steerable wheel is further provided with a detent or other release mechanism for securing the wheel in a parallel or perpendicular orientation relative to the frames longitudinal axis, assisting in maneuvering or fixing the ramp's position.

When the first upper and second lower frames are unfolded so that their connected ends approach, the extent of the sweep of the planar bridging extension positions the second lower ramp at an obtuse angle relative to the first frame. Preferably, the second lower ramp is positioned at an angle between substantially 95 degrees to substantially 110 degrees. Most preferably, the frame are angled at substantially 100 degrees to each other.

Preferably, an open end of the second lower ramp is supported by a castor wheel is spaced laterally and opposite the pivoting wheel to minimize flexing of the ramp under loading.

BRIEF DESCRIPTION OF THE DRAWINGS

FIG. 3 is a partial end view of the ramp apparatus of FIG. 1, in the folded position, showing the relative positioning of the wheels for movement about the tarmac;

FIG. 5 is a partial perspective view of the arcuate planar bridging extension between the lower and upper ramp sections;

FIG. 6a is a simplified plan view of the ramp in the folded position with the wheels positioned for forward and backwards movement for tarmac positioning as a unitary structure;

FIG. 6b is a plan view of the ramp in the folded position while turning; and

FIG. 6c is a plan view of the ramp in a partially unfolded position showing the positioning of the steering wheel for pivoting of the lower ramp section towards alignment with the upper ramp section in the unfolded position.

DETAILED DESCRIPTION OF THE PREFERRED EMBODIMENT

Figure 1:
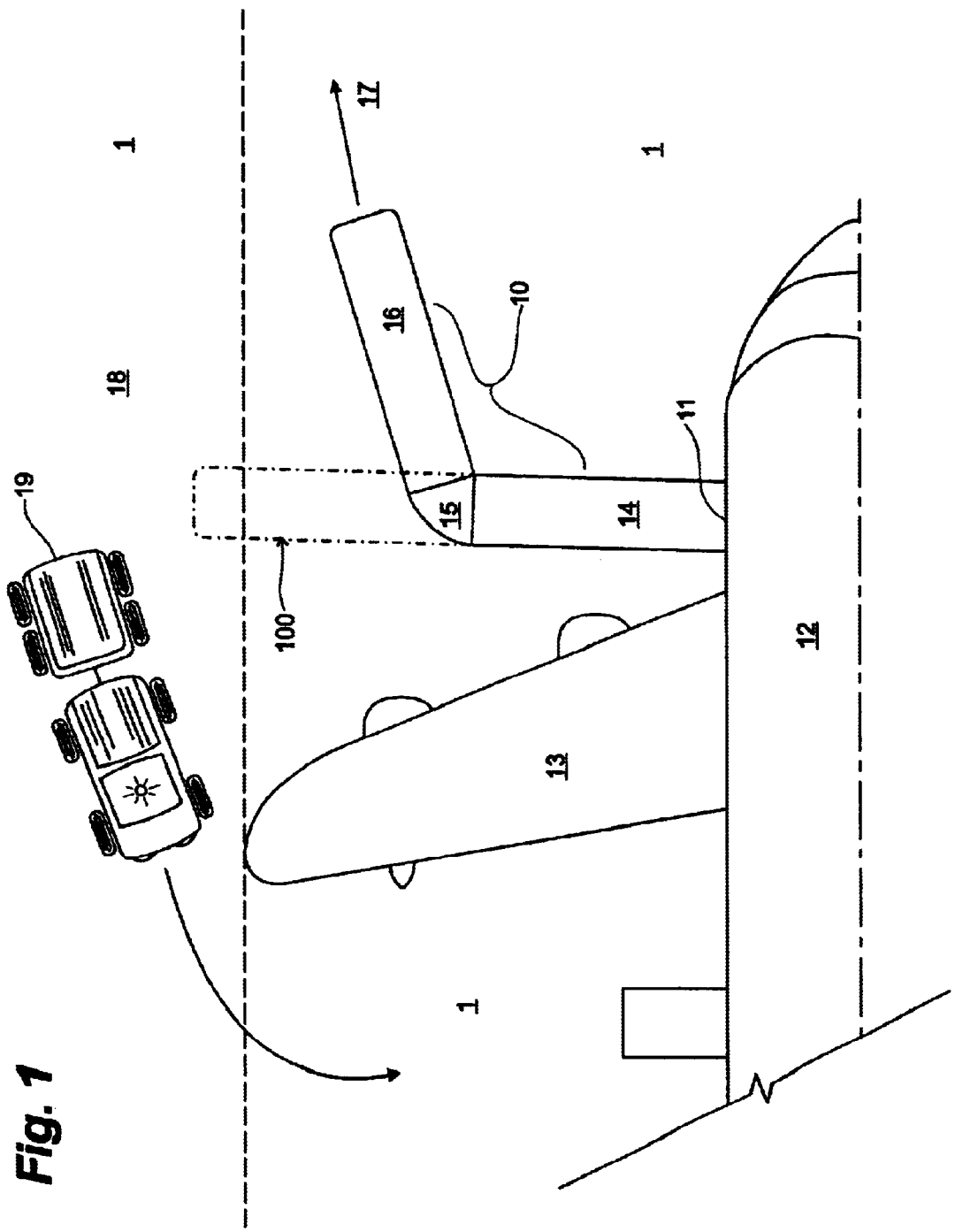
FIG. 1 is a plan view of the ramp of the present invention connected to the passenger door of an aircraft and illustrating a safe angle for discharge and loading of passengers relative to the aircraft and within a "No-Go" zone demarked by dashed lines, and the prior art ramp having the same slope which then encroaches on the "no-Go' zone as shown in dotted lines.

Having reference to FIG. 1, a maneuverable ramp 10 of the present invention is shown in an unfolded position and connected to an elevated structure such as the portside passenger door 11 of an aircraft 12, typically located in front of a wing 13. A first upper frame 14 provides a surface forming a ramp extending down from the door 11. A second lower frame 16 also has a surface forming a ramp extending upwardly from the ground or airport tarmac 1. An arcuate planar bridging section 15, connects the ramp surfaces of the first upper and second lower frames 14,16 so as to form a contiguous ramp 10. The second lower frame 16 is angled at an obtuse angle from the first upper frame 14, and forward relative to the aircraft's wing 13, so as to reduce the extent of the ramp 120 and thereby terminate the ramp 10 within a safe zone 17 (shown in dashed lines) on the airport tarmac 1. The angle permits the ramp's slope to be low, yet have a compact footprint. The angle between the frames 14, 16 also provides a footprint which is stable. Without angling the frames 14,16, the ramp 10 would extend into an unsafe or "no go" zone 18, as is the case with similarly sloped prior art straight ramps 100 (shown in dotted lines), where boarding or deplaning passengers would be either create a hazard or be subjected to hazards, such as vehicular traffic 19.

Figure 2:
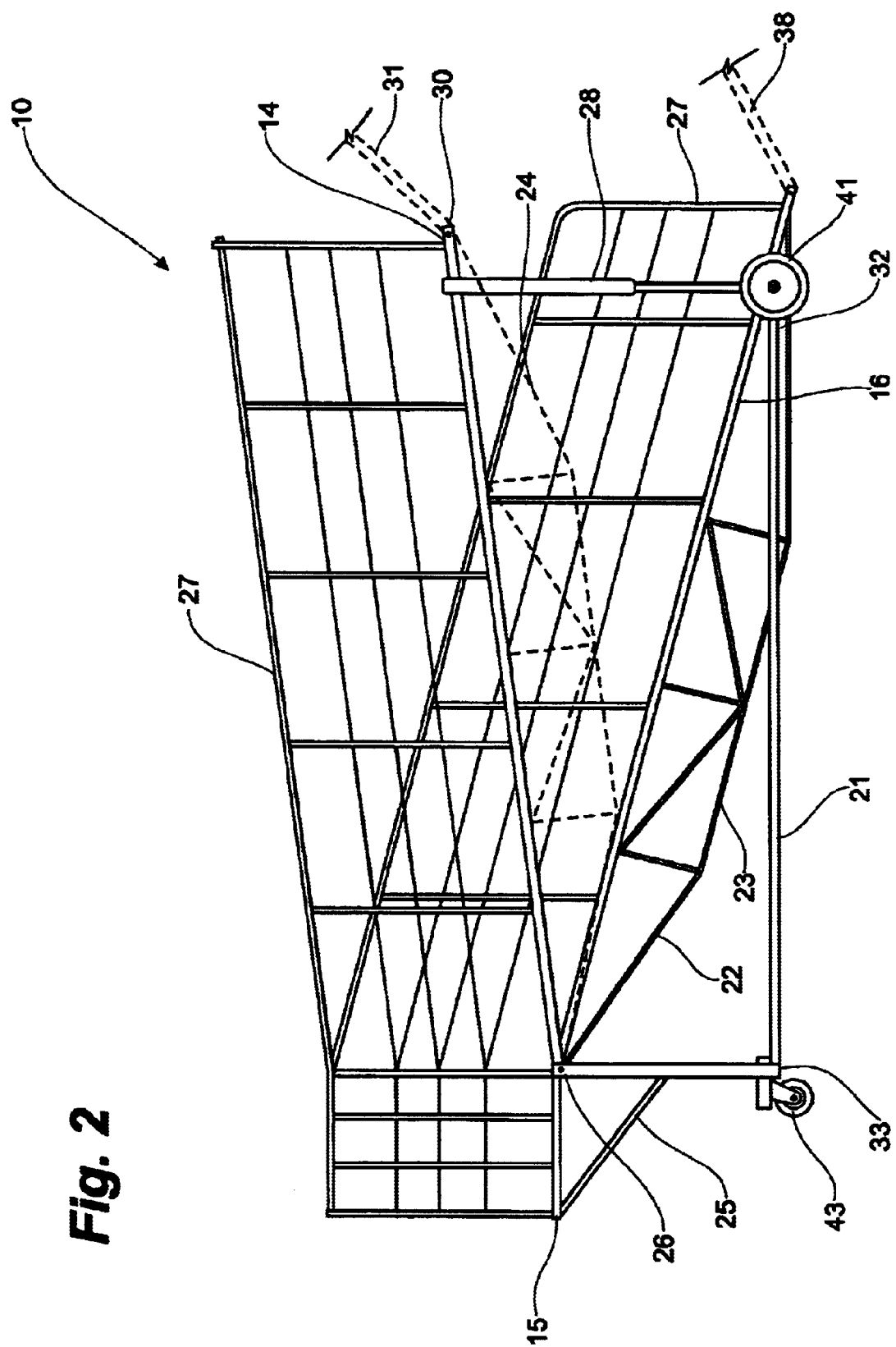
FIG. 2 is a side view of the ramp apparatus, according to FIG. 1, showing the upper and lower ramp sections folded parallel to one another in the folded position.

Having reference to FIGS. 2 and 3, the ramp 10 is shown in a folded position wherein the second lower frame 16 is rotated about a pivot 20 so that the second lower frame is substantially parallel to the first frame 14. A pivot 20, comprises pairs of upper and lower flanges 20a, 20b extending from a connected end 33 of the first frame and a connected end 34 of the second lower frame and connected by pins 20c.

The first upper and second lower frames 14,16 comprise surfaces, which can be inclined to form passenger ramp surfaces, and structural supports 21, 22 formed of lightweight structural tubing, preferably aluminum. Truss members 23,24 underlie the frame's ramp surfaces for supporting the weight of the ramp 10. The truss 24 for the first upper frame 14 is shown in dashed lines for clarity of the underlying structure. Angled support members 25 attached below the arcuate connector 15, are fixed to the second lower frame 22 so as to position the connector 15 to extend beyond an upper end 26 of the second lower frame's structural support 22 and to support the connector 15 under loading. Handrails 27 are provided on either side of the first upper and second lower frames 14,16.

Preferably, the first upper frame's structural support 21 has a pair of extensible legs 28,29 at an open end 30. The extensible legs 28,29 permit the open end 30 to be adjusted to the height of individual aircraft. Typically, the extensible legs 28, 29 are self-locking Acme screws and are further provided with a backup locking mechanism (not shown) to fix the height of the first upper frame's open end during operation. Additionally, a bridging gangway 31 (not shown) is pivotally connected to the open end 30 for engaging the doorway 11 of the aircraft 12. Such a gangway can include apparatus which bridges between the aircraft and the ramp 10 while adapting to lateral, angular and height misalignment.

In more detail, and having reference again to FIG. 3, the first upper frame's structural support 21 further comprises an axle 40 and a pair of fixed-direction rotating wheels 41, 42 connected to the structural support 21 adjacent the open end 30. The orientation of the wheels 41,42 is substantially parallel to the longitudinal axis of the first frame 14 as shown in FIG. 6a.

A pivoting wheel or castor 43 is attached to the connected end 33 of the first upper frame's structural support 21. The castor 43 is attached to the support 21 and positioned adjacent the pivot 20 so as to support both the connected ends 33,34 of both frames' structural supports 21, 22. The castor 43 is pivotable to permit the connected ends 33, 34 of the two frame's 14, 16 to be steered while maneuvering such as to the aircraft 12 as shown in FIG. 6b.

Figure 4A:
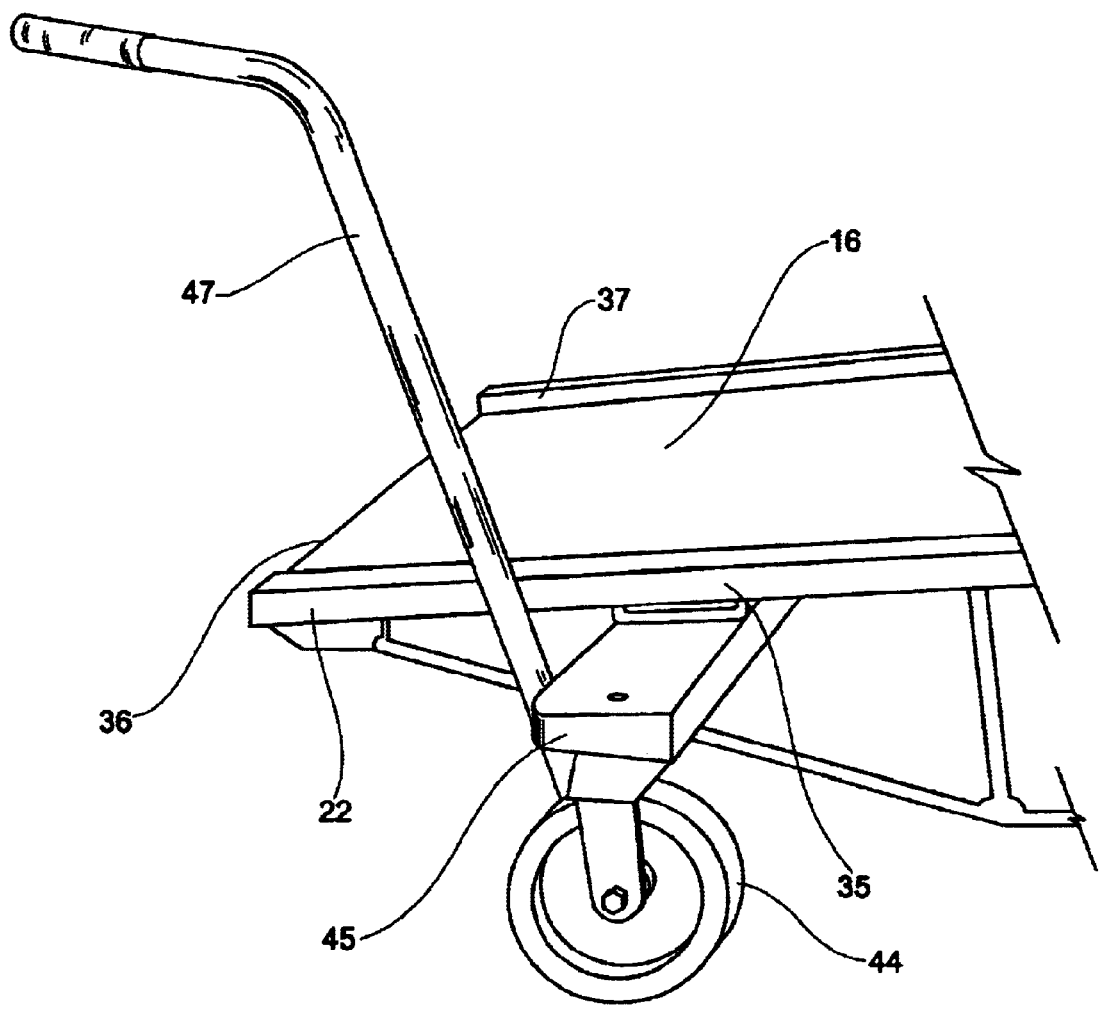
FIG. 4a is a partial perspective view of the steerable pivoting wheel attached adjacent to the lower entrance to the lower ramp section, in position for forward and backward tarmac positioning of the folded ramp.
Figure 4B:
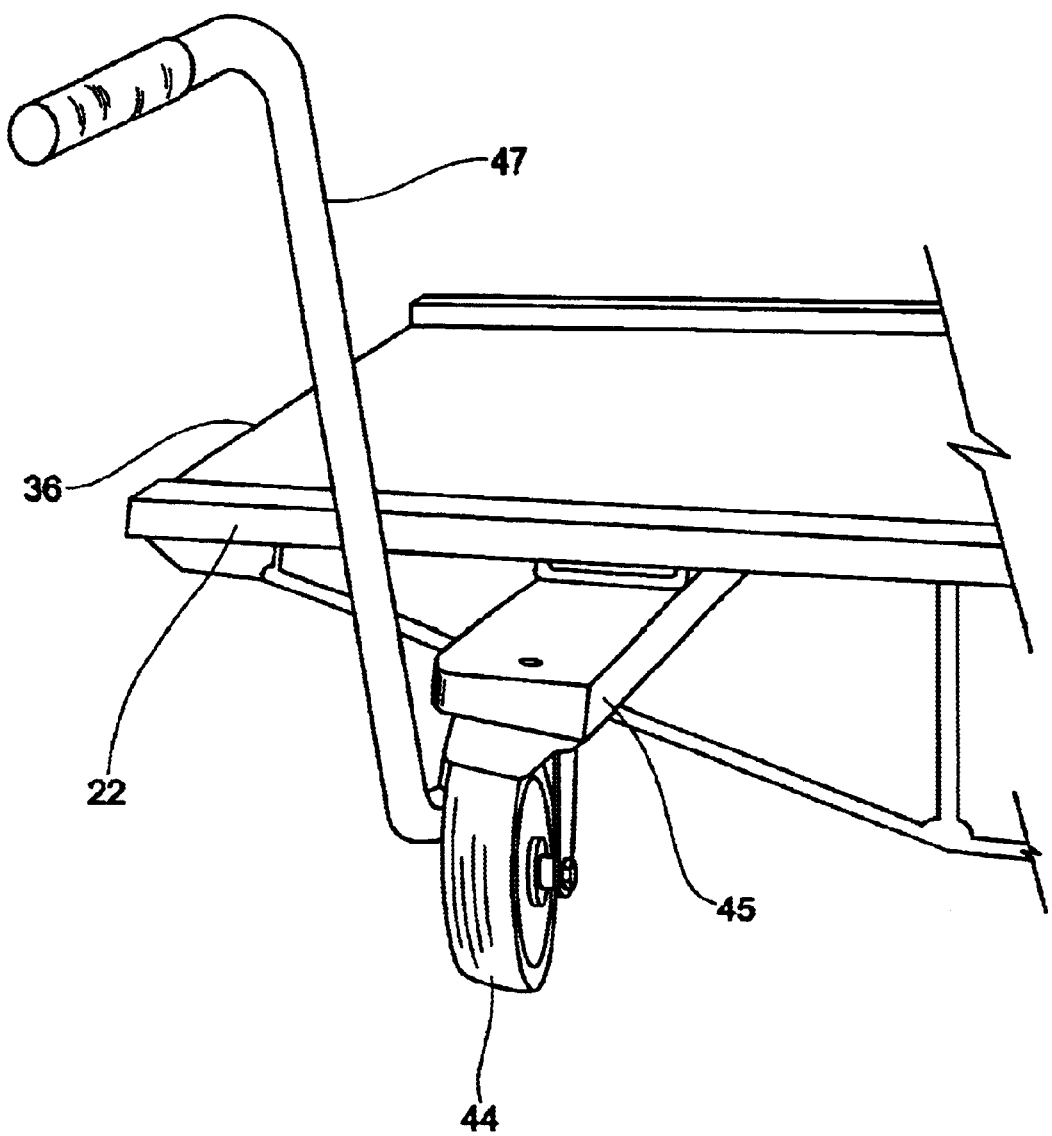
FIG. 4b is a partial perspective view of the steerable pivoting wheel of FIG. 4a in position to pivot the lower ramp section into alignment with the upper ramp section in the unfolded position.

As shown in FIGS. 3, 4a and 4b, a second steerable, pivoting wheel 44 is attached to a perpendicular extension 45 connected to the second lower frame's structural support 22, positioning the wheel 44 to extend from an outside edge 35 of the second support 22 at an open end 36 of the second lower frame 16, much like an outrigger. The steerable wheel 44 is pivotally adjustable about its connection to the extension 45 from a first position, wherein the orientation of wheel 44 rotation is substantially parallel to the longitudinal axis of the second lower frame 16 (FIG. 4a), to a second position, wherein the orientation of the wheel is substantially perpendicular to a radial extending between the wheel and the pivot 20 (FIG. 4b). The steerable wheel 44 is pivoted to the second position for supporting the second lower frame 16 when it is rotated about pivot 20 to the unfolded position, as shown in FIG. 6c. Preferably, a handle 47 is attached to the steerable wheel 44 for selectively steering the wheel 44 into position to rotate the second lower frame 16 relative to the first frame 14, about pivot 20.

Further, a mechanism is attached to the wheel 44 to permit securing the wheel 44 into either the first or second position.

Such a mechanism can be an indexing pin and hole arrangement or a biased detent device.

Optionally, additional wheels or castors can be added to either frame to provide further support and maneuverability.

As shown in FIGS. 1 and 5, the arcuate planar bridge 15, which extends beyond the second lower frame's upper end 26 as described above, provides a surface and a connection between the ramp surfaces of the first upper and second lower frames 14,16 for forming a contiguous ramp 10 when the frames 14,16 are pivoted to the unfolded position. The sweep of the connector 15 is curved sufficiently to limit relative rotation of first upper and second lower frames 14,16 to extend at an obtuse angle when unfolded. Typically an angle of substantially 95 degrees to substantially 110 degrees is sufficient, with substantially 100 degrees being a preferred angle, to ensure passengers do not enter the "no-go" zone during loading and unloading, and which provides a wide and sable operating "footprint" to aid wind stability.

Optionally, as shown in FIGS. 6a–6c, a small castor wheel 50 can be connected to an inner edge 37 of the lower end 36 of the second lower frame 16, opposite the steerable pivoting wheel 44, for preventing the second lower frame's open end 36 from flexing unduly under loading. Further, a ramp extension 38 (shown in dotted lines on FIG. 2) is pivotally connected to the second lower frame's open end 36 to provide a smooth transition onto the tarmac 1.

The mobile folding ramp, while directed to use with aircraft, can be used wherever a compact, foldable ramp between structures is required. The materials of construction of the mobile ramp are preferably lightweight tubing and plating, further aided by the use of lightweight materials such as aluminum. It is advantageous and prudent to keep the ramp weight as low as possible so that it can be manually positioned as the use of heavier powered equipment has been found to be a hazard to the aircraft. The direction of unfolding and the angle in operation may be varied as necessary to adapt to different aircraft and more particularly the location of the cabin door, be it in front or rearward of the wing and whether the door is in the port or starboard sides. The form of the handrails and other safety considerations are provided for illustrative purposes only and can be removed entirely for cargo situations where passenger safety is not a consideration. The orientation of the first upper and second lower frames and the frames' structures to which the different types of wheels are attached, can be varied.

Embodiments of the invention for which an exclusive property or privilege is claimed are described as follows:

1. A mobile ramp comprising:
    a first frame having a ramp surface, at least two wheels at an open end and at least one pivoting wheel at a connected end;
    at least a second frame having a ramp surface, an open end, and a connected end which is pivotally connected to the first frame's connected end, the first and second frame's being rotatable laterally about their connected ends between a folded position substantially parallel to one other and an unfolded position at an angle to one other;
    a bridge having a ramp surface for extending between the connected ends of the first and second frames when in the unfolded position so that a substantially contiguous ramp is formed between the first and second frames' respective open ends; and
    a pivoting wheel for supporting the second frame's open end during rotation between the folded and unfolded positions.

2. The mobile ramp as described in claim 1 wherein the first frame is an upper frame and the second frame is a lower frame.

3. The ramp as described in claim 2 wherein an elevation of the first upper frame's open end is adjustable.

4. The ramp as described in claim 1 wherein the pivoting wheel at the first frame's connected end is positioned adjacent the pivot between the first and second frames so as to balance the frames as a unitary structure in the folded position.

5. The ramp as described in claim 1 wherein the pivoting wheel at the second frame's open end is steerable between at least a first wheel position parallel to a longitudinal axis of the second frame and a second wheel position substantially perpendicular to the second frame's longitudinal axis so as to permit rotation of the second frame about the pivot.

6. The ramp as described in claim 5 wherein the second frame's pivoting wheel further comprises detent means so as to permit the pivoting wheel to be releaseably retained in either of the first or second wheel position.

7. The ramp as described in claim 1 wherein the second frame is aligned at an obtuse angle relative to the first frame in the unfolded position.

8. The ramp as described in claim 7 wherein the obtuse angle is from substantially 95 degrees to substantially 110 degrees.

9. The ramp as described in claim 8 wherein the obtuse angle is substantially 100 degrees.

10. The ramp as described in claim 1 wherein the bridge is an arcuate planar extension of the second frame's connected end.

11. The ramp as described in claim 10 wherein the second frame's open end is further supported against flexing under loading by a castor wheel positioned laterally and opposite the pivoting wheel.

12. A mobile ramp for loading and unloading passengers from an aircraft comprising:
    a first upper frame connected to a second lower frame at a pivot, the first and second frames pivotal between folded and unfolded positions;
    a bridge at the pivot and extending between first upper and second lower frames so as to form a contiguous ramp between an open end of the first upper frame and an open end of the second lower frame; and
    wheels at the pivot and at each of the open ends of the first upper and second lower frames, at least one of the open ends having wheels which are pivotable.

13. The mobile ramp as described in claim 12 wherein the wheels at the first upper and second lower frames' open ends align along a common axis when the frames are in the folded position.

14. The mobile ramp as described in claim 13 wherein the wheels at the first upper and second lower frames open ends are parallel to a longitudinal axis of the first upper frame.

15. The mobile ramp as described in claim 12 wherein the pivoting wheel at the second lower frame's open end is steerable between at least a first wheel position parallel to a longitudinal axis of the second frame and a second wheel position substantially perpendicular to the second lower frame's longitudinal axis so as to permit rotation of the second frame about the pivot.

16. The mobile ramp as described in claim 15 wherein the pivoting wheel further comprises detent means so as to permit the pivoting wheel to be releaseably retained in either of the first or second wheel position.

17. The mobile ramp as described in claim 12 wherein the second lower frame is aligned at an obtuse angle relative to the first upper frame in the unfolded position.

18. The mobile ramp as described in claim 17 wherein the obtuse angle is from substantially 95 degrees to substantially 110 degrees.

19. The mobile ramp as described in claim 18 wherein the obtuse angle is substantially 100 degrees.

20. The mobile ramp as described in claim 19 wherein the second lower frame's open end is further supported against flexing under loading by a castor wheel positioned substantially laterally and opposite the pivoting wheel.

21. The mobile ramp as described in claim 12 wherein the bridge is an arcuate planar extension of the second lower frame's connected end.

22. The mobile ramp as described in claim 12 wherein an elevation of the first upper frame's open end is adjustable to an elevated door of the aircraft.

\* \* \* \* \*